A. STEPANEK.
HEADLIGHT FOR AUTOMOBILES.
APPLICATION FILED OCT. 31, 1911.

1,021,275.

Patented Mar. 26, 1912.

2 SHEETS—SHEET 1.

Witnesses
Jas. T. McCathran
H. F. Riley

Anton Stepanek, Inventor

By E. G. Siggers
Attorney

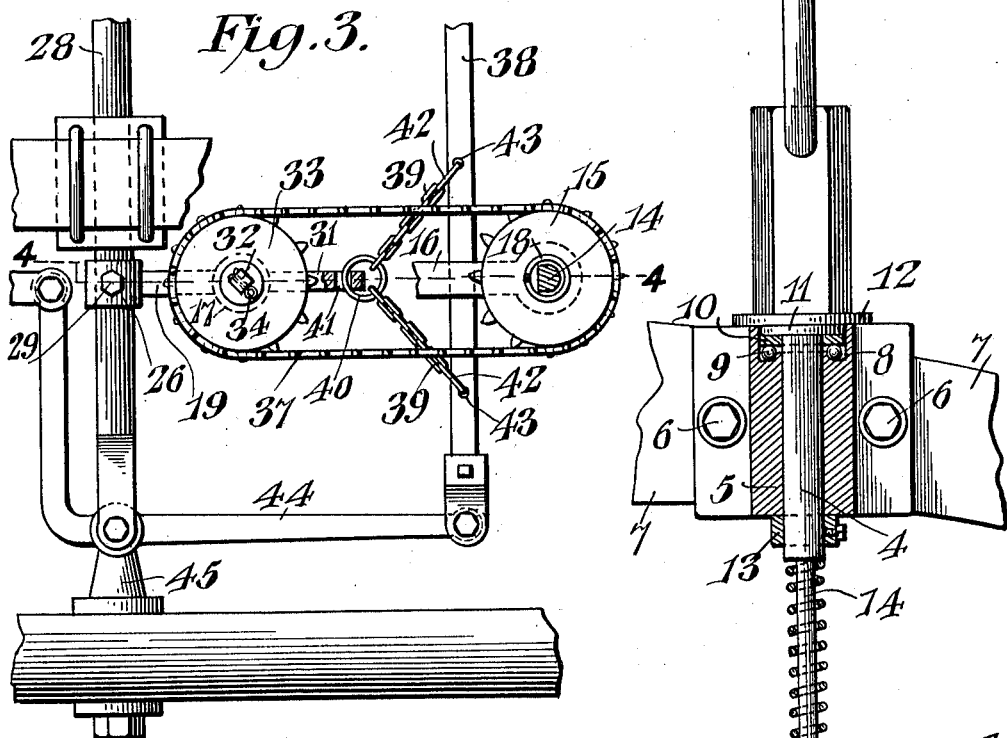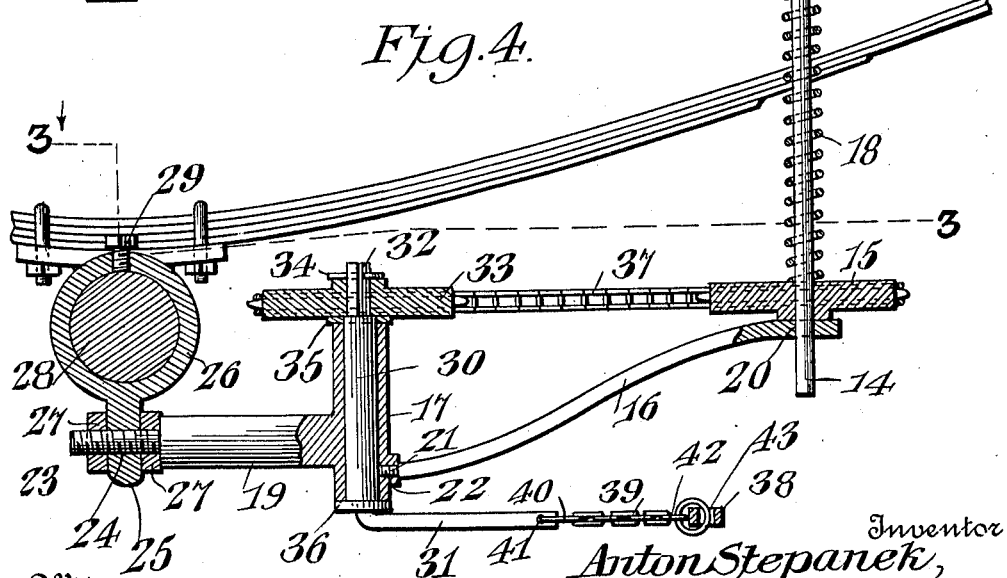

UNITED STATES PATENT OFFICE.

ANTON STEPANEK, OF NEWCASTLE, INDIANA.

HEADLIGHT FOR AUTOMOBILES.

1,021,275.  Specification of Letters Patent.  Patented Mar. 26, 1912.

Application filed October 31, 1911. Serial No. 657,787.

*To all whom it may concern:*

Be it known that I, ANTON STEPANEK, a subject of the Emperor of Austria-Hungary, residing at Newcastle, in the county of Henry and State of Indiana, have invented a new and useful Headlight for Automobiles, of which the following is a specification.

The invention relates to improvements in headlights for automobiles.

The object of the present invention is to improve the construction of headlights for automobiles, and to provide simple, efficient and inexpensive means for mounting the headlights on an automobile or analogous motor vehicle, and for connecting them with the steering mechanism, whereby when the front wheels are turned to change the direction of the machine, the headlights will be correspondingly turned so as to throw the light in the direction in which the machine is traveling to enable the operator to see around corners of streets and bends or curves of roads, thereby affording greater safety to both the occupants of a vehicle and the public.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
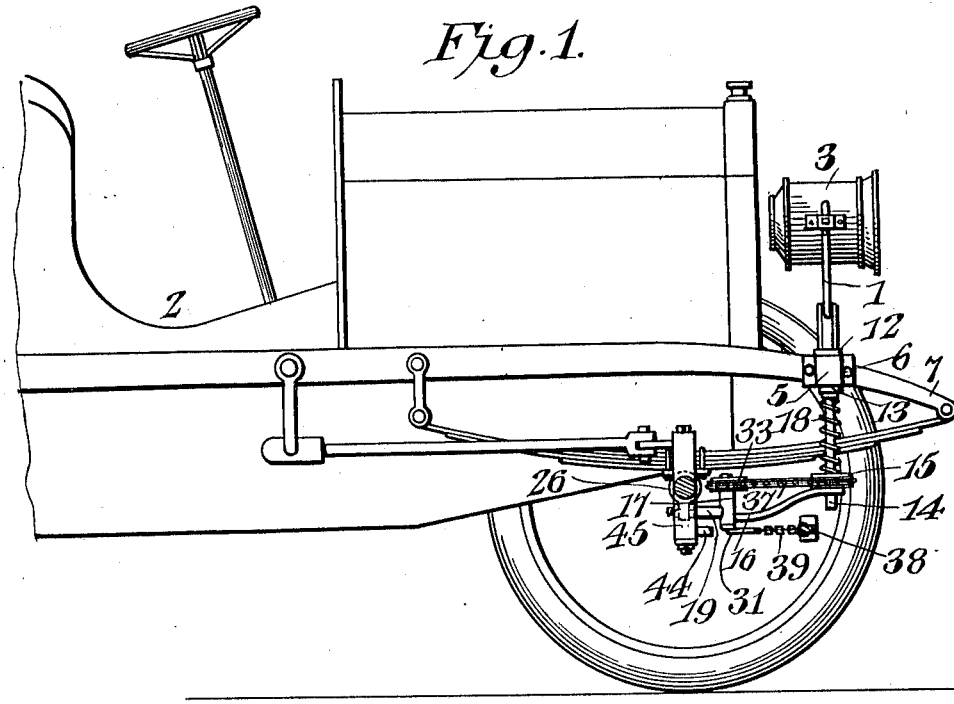
Figure 2:
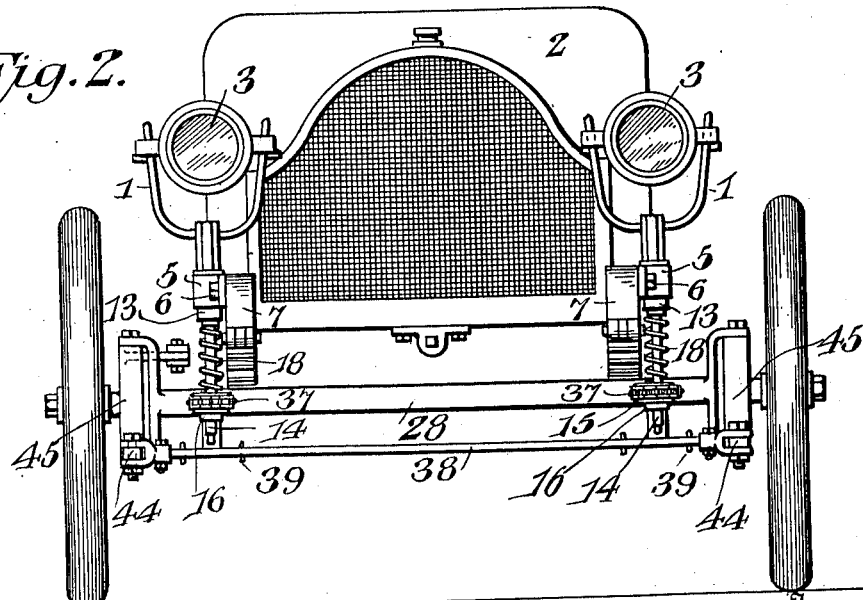

In the drawings:—Figure 1 is a side elevation of an automobile headlight, constructed in accordance with this invention, and shown applied to an automobile, the latter being partly in section. Fig. 2 is a front elevation of the same. Fig. 3 is an enlarged horizontal sectional view on the line 3—3 of Fig. 4. Fig. 4 is a vertical sectional view on the line 4—4 of Fig. 3.

Like numerals of reference designate corresponding parts in all the figures of the drawings.

In the accompanying drawings in which is illustrated the preferred embodiment of the invention, 1—1 designate lamp brackets designed to be mounted at opposite sides of an automobile 2 or other machine at the front thereof and supporting the lamps 3, which form the headlights of the automobile. The lamp bracket is equipped with a vertical stem, having an upper bearing portion 4 journaled in a suitable bearing 5, secured by bolts 6, or other suitable fastening devices to the side beam or member 7 of the frame of the automobile, and having a vertical bearing opening to receive the spindle portion 4 of the stem of the lamp bracket. The bearing 5 is also provided at the top with an annular recess 8, arranged concentric with the vertical opening of the bearing 5 and forming a ball race for the reception of anti-friction balls 9, which support the lamp bracket, a washer 10 being preferably interposed between the anti-friction balls and a horizontal shoulder 11 of the lamp bracket. The lamp bracket is also provided with a projecting annular flange 12, which extends over and forms a dust cap for the bearing 5.

The stem, which is held against vertical movement in the bearing 5 by a set collar 13, or other suitable device, is provided with a reduced lower depending portion 14, having a flat face at one side and being approximately D-shaped in cross section to slidably engage a corresponding opening in a front sprocket wheel 15, but the lower reduced portion of the stem and the opening of the front sprocket wheel may be of any other preferred polygonal shape, and any other suitable means may be employed for slidably interlocking the stem of the lamp bracket with the gear wheel 15. The gear wheel 15 is maintained seated upon a forwardly extending arm 16 of a bearing bracket 17 by a coiled spring 18, disposed on the lower depending portion of the stem and interposed between the gear wheel 15 and the lower end of the spindle portion 4, which forms a shoulder. By this construction the device is adapted to yield to the vertical cushioning action of the springs of the machine, which does not affect the connection between the lamp bracket and the gearing for turning the same on its stem or pivot.

The bearing bracket 17 consists of a vertical tubular bearing portion, provided at the front with the said forwardly extending arm 16 and having a rearwardly extending arm 19 at the back. The arm 16, which is arranged at an inclination, extends forwardly and upwardly and is provided at its front or outer end with a circular opening 20 to receive the lower depending portion of the stem of the lamp bracket, and the inner or rear end 21 of the arm or brace 16 is threaded to engage a threaded opening 22 of the tubular portion of the bearing bracket, but the said arm or brace may be connected with the bearing bracket in any other desired manner. The rearwardly extending arm 19 has a reduced threaded terminal portion 23, which is secured in an opening 24 of a depending lug 25 of a collar 26 by nuts 27, located at opposite sides of the lug and engaging the threaded terminal portion 23 of the arm 19. The collar is adjustably clamped on the axle 28 by a set screw 29.

The vertical tubular portion of the bearing bracket 17 receives a vertically disposed rock shaft 30, provided at its lower end with an arm 31 and having its upper end 32 reduced and squared to receive a rear sprocket wheel 33, provided with a rectangular opening to fit the squared portion 32 and secured thereto by a key 34, or other suitable fastening device. A disk or washer 35 is preferably interposed between the sprocket wheel 33 and the upper end of the tubular portion of the bearing bracket 17, and the rock shaft is equipped at its lower end with a head or flange 36, which fits against the lower end of the tubular bearing. The rear sprocket wheel 33 is connected with the front sprocket wheel 15 by sprocket chains 37, and the arm 31, which extends forwardly from the vertical rock shaft 30, is connected at its front end with the transversely disposed shiftable connecting rod or bar 38 of the steering mechanism by diverging chains 39, or other suitable flexible connections. The chains are connected at their inner ends to a ring 40, which is linked into an opening 41 of the arm 31, and the outer ends of the chains 39 are provided with enlarged links or rings 42, which are linked into perforations 43 of the transverse connecting bar 38. The connecting bar 38 extends across the front portion of the running gear and is pivotally connected at its ends in the usual manner with arms 44 of the pivoted spindle 45 of the front axle.

Any suitable steering mechanism may be employed, and the device is applicable to any automobile, or motor vehicle having a shiftable transversely disposed bar for connecting the pivoted spindles of the front axle. When the bar 38 is shifted to the right, the forwardly extending arm of the rock shaft will be swung in the same direction and the sprocket gearing will turn the headlights on their pivots in the direction in which the wheels are turned, and will maintain the same in parallelism with the front wheels.

Having thus fully described my invention, what I claim as new and desire to secure by Letters Patent, is:—

1. In a device of the class described, the combination with a wheeled vehicle including an axle having pivoted spindles, and a transversely shiftable bar connected with the spindles, of a lamp bracket having a stem or pivot mounted on the frame of the vehicle in advance of the said axle, a bearing bracket secured to the axle and extending forwardly therefrom and having an opening through which the stem or pivot passes, gearing supported by the bearing bracket and slidably receiving the stem or pivot of the lamp bracket to permit vertical movement of the latter, and means for communicating motion from the shiftable bar to the gearing for causing the lamp bracket to turn with the pivoted spindles.

2. A device of the class described including a lamp bracket having a vertical stem or pivot, a bearing receiving the stem or pivot and provided with means for securing it to the frame of a wheeled vehicle, a bearing bracket having means for securing it to the axle of the vehicle, gearing supported by the bearing bracket and slidably receiving the vertical stem or pivot of the lamp bracket and interlocked with the same, and means for communicating motion from the steering mechanism of the vehicle to the said gearing for causing the lamp bracket to turn with the wheels in changing the direction of the vehicle.

3. In a device of the class described the combination with a vehicle including a transversely shiftable connecting bar, a lamp bracket having a vertical pivot, a bearing receiving the vertical pivot and having means for securing it to the frame of a wheeled vehicle, a bearing bracket provided with means for securing it to the axle of a vehicle and having a forwardly extending portion, a vertical rock shaft mounted in the bearing bracket and provided with an arm having means for connecting it with the transversely shiftable connecting bar of the vehicle, and gearing supported by the bracket and connected with the rock shaft and with the stem or pivot of the lamp bracket.

4. In a device of the class described the combination with a vehicle including a transversely shiftable connecting bar, a lamp bracket having a vertical pivot, a bearing receiving the vertical pivot and having means for securing it to the frame of a wheeled vehicle, a bearing bracket provided with means for securing it to the axle of a vehicle and having a forwardly extending portion, a vertical rock shaft mounted in the bearing bracket and provided with an arm having means for connecting it with the transversely shiftable connecting bar of the vehicle, gearing supported by the bracket and connected with the rock shaft and with the stem or pivot of the lamp bracket and slidably receiving the same, and a coiled spring mounted on the stem or pivot above the gearing and bearing against the latter.

5. In a device of the class described the combination with a vehicle including a transversely shiftable connecting rod or bar, a lamp bracket having a depending vertical stem or pivot, a bearing receiving the stem or pivot and having means for securing it to the frame of a wheeled vehicle, a bearing bracket including a vertical tubular portion and forwardly and rearwardly extending arms, the forwardly extending arm having an opening through which the stem or pivot passes, a collar provided with means for securing it to an axle and having a lug or portion receiving and supporting the rearwardly extending arm of the bearing bracket, a vertical rock shaft mounted in the tubular portion of the bracket and provided with a forwardly extending arm, a rear sprocket gear connected with the rock shaft and supported by the bearing bracket, a front sprocket wheel seated upon the forwardly extending arm and slidably receiving the stem or pivot, a sprocket chain arranged on the sprocket wheels, a coiled spring disposed on the stem or pivot and bearing against the front sprocket wheel, and means for connecting the arm of the rock shaft with the transversely shiftable connecting rod or bar of the vehicle.

In testimony, that I claim the foregoing as my own, I have hereto affixed my signature in the presence of two witnesses.

ANTON STEPANEK.

Witnesses:
ROBERT THOMON,
WILLIAM H. BELL.